US011823013B2

United States Patent
Witbrock et al.

(10) Patent No.: US 11,823,013 B2
(45) Date of Patent: Nov. 21, 2023

(54) TEXT DATA REPRESENTATION LEARNING USING RANDOM DOCUMENT EMBEDDING

(71) Applicant: International Business Machines Corporation, Armonk, NY (US)

(72) Inventors: Michael J. Witbrock, Ossining, NY (US); Lingfei Wu, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1097 days.

(21) Appl. No.: 15/689,799

(22) Filed: Aug. 29, 2017

(65) Prior Publication Data
US 2019/0065986 A1 Feb. 28, 2019

(51) Int. Cl.
G06N 20/00 (2019.01)
G06F 16/33 (2019.01)

(52) U.S. Cl.
CPC ......... *G06N 20/00* (2019.01); *G06F 16/3331* (2019.01)

(58) Field of Classification Search
None
See application file for complete search history.

(56) References Cited

U.S. PATENT DOCUMENTS

| 10,366,327 | B2 | 7/2019 | Le | |
|---|---|---|---|---|
| 2007/0094384 | A1* | 4/2007 | Matsumura | G06Q 10/10 709/224 |
| 2012/0150532 | A1* | 6/2012 | Mirowski | G06F 40/40 704/9 |
| 2013/0081056 | A1* | 3/2013 | Hu | G06F 16/35 719/313 |

(Continued)

FOREIGN PATENT DOCUMENTS

| CN | 104778158 A | 7/2015 |
|---|---|---|
| CN | 105955955 A | 9/2016 |

(Continued)

OTHER PUBLICATIONS

Quoc Le and Thomas Mikolov, "Distributed Representations of Sentences", Proceedings of the 31st International Conference on Machine Learning, 2014. (Year: 2014).*

(Continued)

*Primary Examiner* — Alexey Shmatov
*Assistant Examiner* — Beatriz Ramirez Bravo
(74) *Attorney, Agent, or Firm* — CANTOR COLBURN LLP; Stosch Sabo

(57) ABSTRACT

Embodiments of the present invention provide a computer-implemented method for performing unsupervised feature representation learning for text data. The method generates reference text data having a set of random text sequences, in which each text sequence of set of random text sequences is of a random length and comprises a number of random (Continued)

words, and in which each random length is sampled from a minimum length to a maximum length. The random words of each text sequence in the set are drawn from a distribution. The method generates a feature matrix for raw text data based at least in part on a set of computed distances between the set of random text sequences and the raw text data. The method provides the feature matrix as an input to one or more machine learning models.

24 Claims, 6 Drawing Sheets

(56) References Cited

U.S. PATENT DOCUMENTS

| | | | |
|---|---|---|---|
| 2013/0173257 A1 | 7/2013 | Rose et al. | |
| 2013/0204885 A1 | 8/2013 | Clinchant et al. | |
| 2014/0229408 A1 | 8/2014 | Mjayaraghavan et al. | |
| 2015/0220833 A1* | 8/2015 | Le | G06F 16/583 |
| | | | 706/16 |
| 2016/0217201 A1 | 7/2016 | Hummel et al. | |
| 2016/0232456 A1 | 8/2016 | Jain et al. | |
| 2017/0098153 A1* | 4/2017 | Mao | G06N 3/0454 |
| 2017/0372696 A1* | 12/2017 | Lee | G10L 15/063 |
| 2018/0129938 A1* | 5/2018 | Xiong | G06N 3/08 |
| 2018/0150605 A1* | 5/2018 | Co | G10L 15/26 |
| 2018/0246896 A1* | 8/2018 | Bailey | G06F 16/334 |
| 2018/0285459 A1* | 10/2018 | Soni | G06N 5/02 |
| 2018/0293499 A1* | 10/2018 | He | G06F 40/289 |
| 2018/0349477 A1* | 12/2018 | Jaech | G06F 16/9535 |
| 2019/0065550 A1* | 2/2019 | Stankiewicz | G06F 16/3347 |

FOREIGN PATENT DOCUMENTS

| | | |
|---|---|---|
| CN | 106407406 A | 2/2017 |
| CN | 106446264 A | 2/2017 |
| CN | 106844346 A | 6/2017 |
| CN | 107077463 A | 8/2017 |
| JP | 2008084064 A | 4/2008 |
| JP | 2013097722 A | 5/2013 |
| JP | 2017509963 A | 4/2017 |
| JP | 2020532012 A | 11/2020 |

OTHER PUBLICATIONS

Franziska Horn, "Context encoders as a simple but powerful extension of word2vec", Jun. 2017. (Year: 2017).*
Blei et al., "Latent Dirichlet Allocation", Journal of Machine Learning Research 3 (2003) 993-1022. (Year: 2003).*
Steyvers et al., "Probabilistic Topic Models", (2007). (Year: 2007).*
PCT International Search Report and Written Opinion; Application No. PCT/IB2018/056441; dated Jan. 4, 2019; 11 pages.
Wang Zixuan et al.; "Recognizing Core Topic Sentences with Improved TextRank Algorithm Based on WMD Semantic Similarity"; Data Analysis and Knowledge Discovery, No. 4, vol. 1; Dated Apr. 30, 2017; 9 pages.
Guo, et al.; "SupervisedWord Mover's Distance"; Advances in Neural Information Processing Systems 29 (NIPS 2016); 9 pages.
Kusner, et al.; "From Word Embeddings to Document Distances"; Washington University in St. Louis, MO; Dec. 5, 2015; 10 pages.
Le, et al.; "Distributed Representations of Sentences and Documents"; Google Inc., Mountain View, CA; Jun. 1, 2016; 9 pages.
Mell et al.; "The Nist Definition of Cloud Computing-Recommendations of the National Institute Standards and Technology"; US Department of Commerce; Sep. 2011; 7 pages.
Mikolov, et al.; "Distributed Representations ofWords and Phrases and their Compositionality"; Advances in Neural Information Processing Systems 26 (NIPS 2013); 9 pages.
Mikolov, et al.; "Efficient Estimation of Word Representations in Vector Space"; International Conference on Learning Representations; Sep. 7, 2013; 12 pages.
JP Notice of Allowance (English Translation); JP Application No. 2020-511764; Filed: Aug. 24, 2018; 2 pages.

* cited by examiner

TEXT DATA REPRESENTATION LEARNING USING RANDOM DOCUMENT EMBEDDING

BACKGROUND

The present invention generally relates to machine learning systems, and more specifically, to performing a machine learning process by using random document embedding of text data.

The phrase "machine learning" broadly describes a function of an electronic system that learns from data. A machine learning system, engine, or module can include a trainable machine learning algorithm that can be trained, such as in an external cloud environment, to learn functional relationships between inputs and outputs, wherein the functional relationships are currently unknown.

The phrase "text data" broadly describes a data structure of an electronic system that includes one or more text sequences in which each text sequence holds a grouping of one or more words. Examples of a text sequence include a sentence, paragraph, document, and the like. Examples of text data include a plurality of sentences, plurality of paragraphs, plurality of documents, and the like. The phrase "text sequence" and the term "document" are often used unteachably herein.

SUMMARY

Embodiments of the present invention provide a computer-implemented method for unsupervised feature representation learning for text data. The method generates reference text data that includes a set of random text sequences. Each text sequence of the set of random text sequences is of a random length and includes a number of random words. Each random length is sampled from a minimum length to a maximum length, in which the random words of each text sequence in the set are drawn from a distribution. The method generates a feature matrix for raw text data based at least in part on a set of computed distances between the set of random text sequences and the raw text data. The method provides the feature matrix as an input to one or more machine learning models.

Embodiments of the invention provide a computer program product for performing unsupervised feature representation learning for text data, the computer program product comprising a computer readable storage medium having program instructions embodied therewith. The program instructions are executable by system operatively coupled to one or more processors to cause the system to perform a method. The method generates reference text data that includes a set of random text sequences. Each text sequence of the set of random text sequences is of a random length and includes a number of random words. Each random length is sampled from a minimum length to a maximum length, in which the random words of each text sequence in the set are drawn from a distribution. The method generates a feature matrix for raw text data based at least in part on a set of computed distances between the set of random text sequences and the raw text data. The method provides the feature matrix as an input to one or more machine learning models.

Embodiments of the present invention provide a system for performing unsupervised feature representation learning for text data. The system includes one or more processors configured to perform a method. The method generates reference text data that includes a set of random text sequences. Each text sequence of the set of random text sequences is of a random length and includes a number of random words. Each random length is sampled from a minimum length to a maximum length, in which the random words of each text sequence in the set are drawn from a distribution. The method generates a feature matrix for raw text data based at least in part on a set of computed distances between the set of random text sequences and the raw text data. The method provides the feature matrix as an input to one or more machine learning models.

Embodiments of the present invention provide a system for performing unsupervised feature representation learning for text data. The system includes a processor; a memory; a reference text data generation component; and a machine learning component. The reference text data generation component is configured to receive a probability distribution of raw text data, and to generate reference text data comprising a set of random text sequences. Each text sequence of the set of random text sequences is of a random length and comprises a number of random words. Each random length is sampled from a minimum length to a maximum length, in which the random words of each text sequence in the set are drawn from the probability distribution. The machine learning component is configured to receive a feature matrix for the raw text data, in which the feature matrix is generated based at least in part on a set of computed distances between the set of random text sequences and the raw text data. The machine learning component is further configured to provide the feature matrix as an input to one or more machine learning models.

Embodiments of the present invention provide a system for performing product for performing unsupervised feature representation learning for text data. The system includes a processor; a memory; a distribution generation component; and a feature matrix generation component. The distribution generation component is configured to generate a probability distribution of raw text data, in which the probability distribution of raw text data is generated based at least in part on a pre-trained or trained word2vec embedding space. The feature matrix generation component is configured to receive reference text data comprising a set of random text sequences. Each text sequence of the set of random text sequences is of a random length and comprises a number of random words. Each random length having been sampled from a minimum length to a maximum length, in which the random words of each text sequence in the set are drawn from the probability distribution. The feature matrix generation component is further configured to generate a feature matrix for the raw text data based at least in part on a set of computed distances between the set of random text sequences and the raw text data using a document distance measuring technique.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
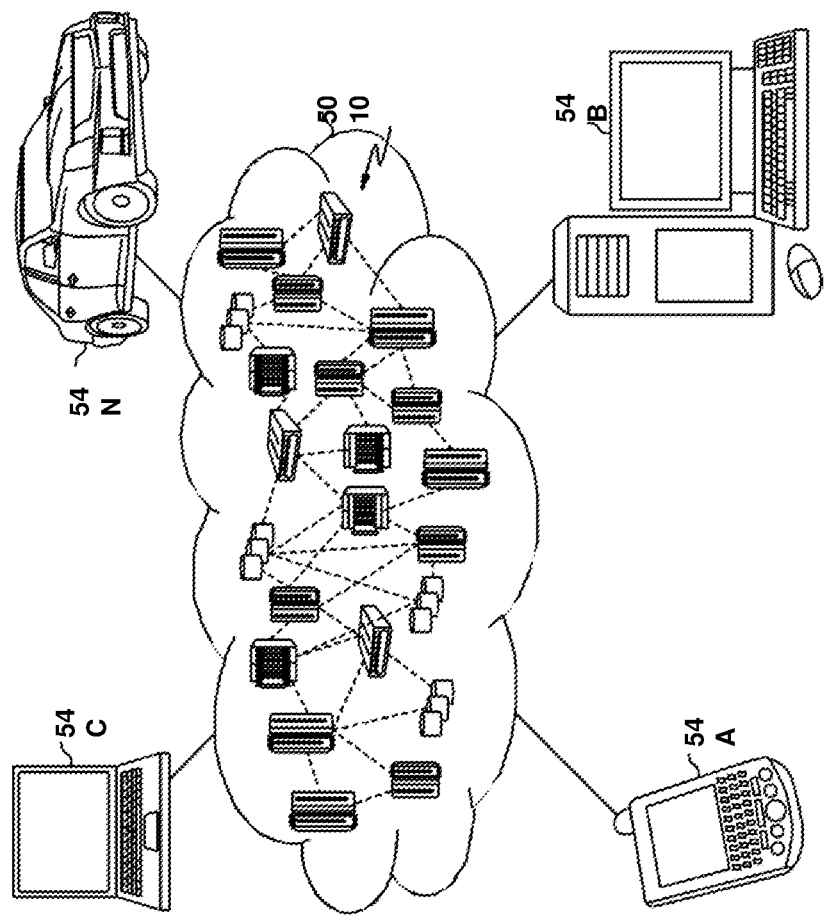
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
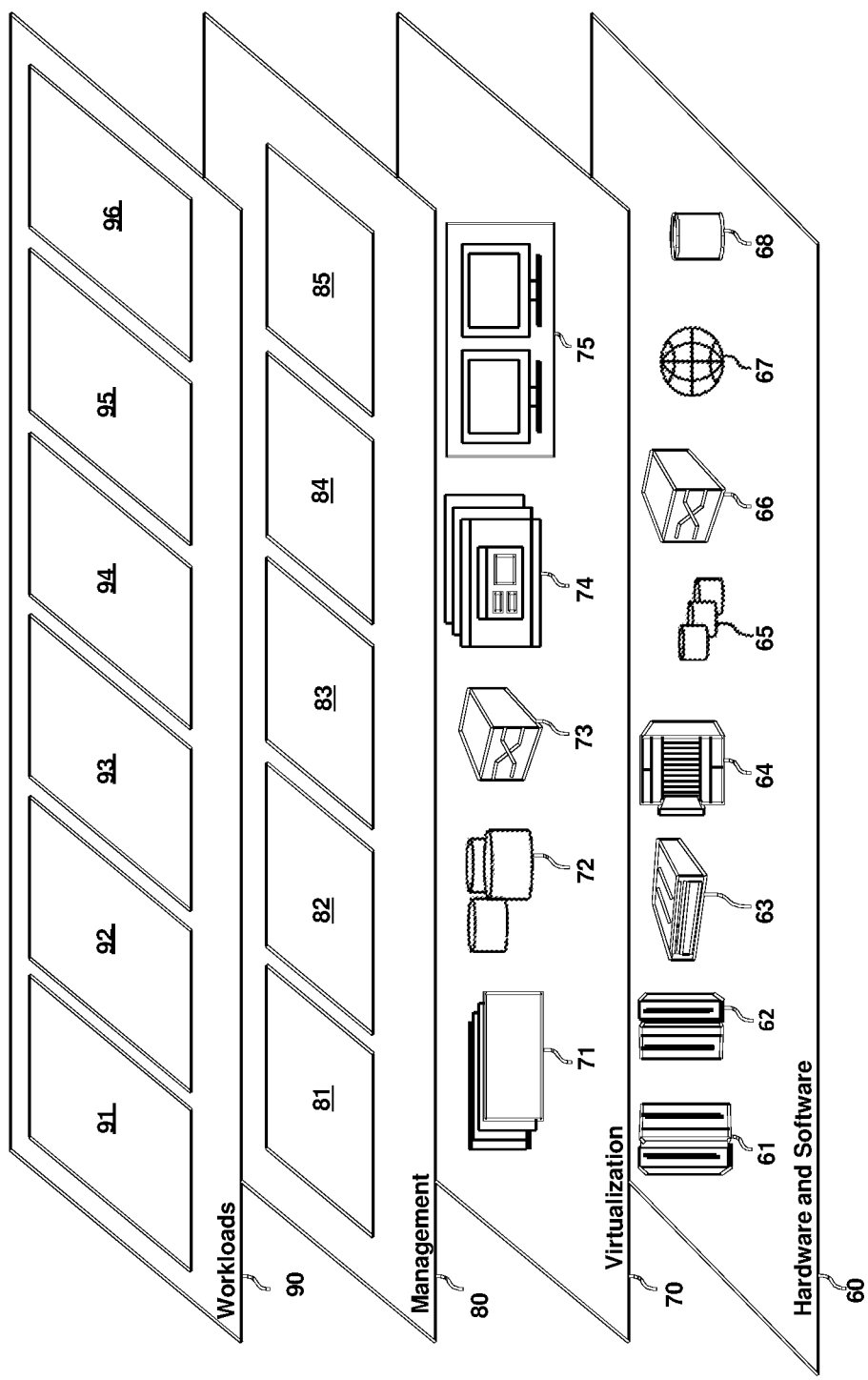
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text data processing 96.

Turning now to an overview of technologies that are more specifically relevant to aspects of the invention, learning effective text representations is a key foundation in numerous machine learning and natural language based processing (NLP) tasks, such as document classification and clustering, document retrieval, machine translation, and multi-lingual document matching. As there are no explicit features in text, some have tried to develop effective representations for text using simple approaches such as through the use of bag of words (BOW) techniques. However, BOW approaches do not consider the word order of text and semantics of words.

Moreover, although some word vector techniques have been known to semantically produce word representations, it is less clear if a sentence or document representation should be built on top of word representation or from scratch. One known technique is to use a distance measure between documents called Word Mover's Distance (WMD) to align semantically similar words. However, WMD is very expensive to compute and difficult to use for feature embedding beyond simple K nearest neighbors (KNN) machine learning approaches.

As previously noted herein, the phrase "machine learning" broadly describes a function of electronic systems that learn from data. A machine learning system, engine, or module can include a trainable machine learning algorithm that can be trained, such as in an external cloud environment, to learn functional relationships between inputs and outputs, wherein the functional relationships are currently unknown. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based at least in part on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Machine learning is often employed by numerous technologies to determine inferences and/or relationships among digital data. For example, machine learning technologies, signal processing technologies, image processing technologies, data analysis technologies and/or other technologies employ machine learning models to analyze digital data, process digital data, determine inferences from digital data, and/or determine relationships among digital data.

Oftentimes digital data is formatted as text data. Text data can include one or more text sequences in which each text sequence holds a grouping of one or words. Examples of a text sequence include a sentence, paragraph, document, and the like. However, text data generally cannot be directly processed and/or directly analyzed by known machine learning models because, as noted above, there are no explicit features in text data. Rather, a feature representation of text data is learned to facilitate analysis of the text data by a machine learning model. Mathematically, a set of documents (e.g., a set of text sequences) may be expressed as $\{x_i\}_{i=1}^N$ where N is the number of documents in the set of documents. Each document x can be expressed as a collection of word vectors $x := (v_j)_{j=1}^L$, where $L = |x_i|$ is the maximum length of the documents in the set, and where $\chi := \cup_{L=1}^{L_{max}} V^L$ denotes the space of documents. Each document can include one or more words.

Turning now to an overview of the aspects of the invention, one or more embodiments of the invention address the above-described shortcomings of the prior art by providing an unsupervised framework that learns vector representations for text of variable lengths such as sentences, paragraphs, and documents, by transforming distance measurements between words in text data into a low-dimensional Euclidean inner product space using a number R of random documents of random lengths D. In some embodiments the process is performed by generating reference text data comprising a set of random text sequences, in which each text sequence is of a random length and comprises a number of random words. Each random length is sampled from a minimum length to a maximum length, and the random words of each random text sequence in the set are drawn from a distribution. The resulting feature matrix is then provided as input to one or more machine learning models to generate a machine learning output.

Examples of the problems that may be addressed by one or more embodiments of the present invention include the reduction of the high computational complexity that is required to evaluate a positive definite kernel using known KNN-WMD based techniques (e.g., $O(N^2 L^3 \log(L))$) and the high memory consumption required to store the raw text data and a resulting kernel matrix (e.g., $O(NL)$).

Examples of technical improvements provided by one or more aspects of the present invention to address the above-described problems include a reduction in the computational complexity of existing KNN-WMD based techniques from $O(N^2 L^3 \log(L))$ to $O(NRLD^2 L \log(L))$ for $R \ll N$ and $D \ll L$ and memory consumption from $O(NL+N)$ to $O(NR)$ for $R \ll L$. This reduction in both computation and memory storage allows for more efficient training and testing when combining with empirical risk minimization (ERM) classifiers such as SVM.

As will be described in more detail below, a feature representation of a text data can be learned to facilitate analysis of the text data by a machine learning model. Text data feature representations can be used for a variety of machine learning processes. For example, text data feature representation can be used in patient disease classification using ECG in health-informatics and real-time data analytics for mobile health applications such as data generated via a sensor from a wearable medical device. The text data representation once learned can be used for document classification, clustering and retrieval, as well as for text analysis, such as, sentiment analysis. Moreover, text data representation once learned can be used to improve machine reading and translation of text documents.

Figure 3:
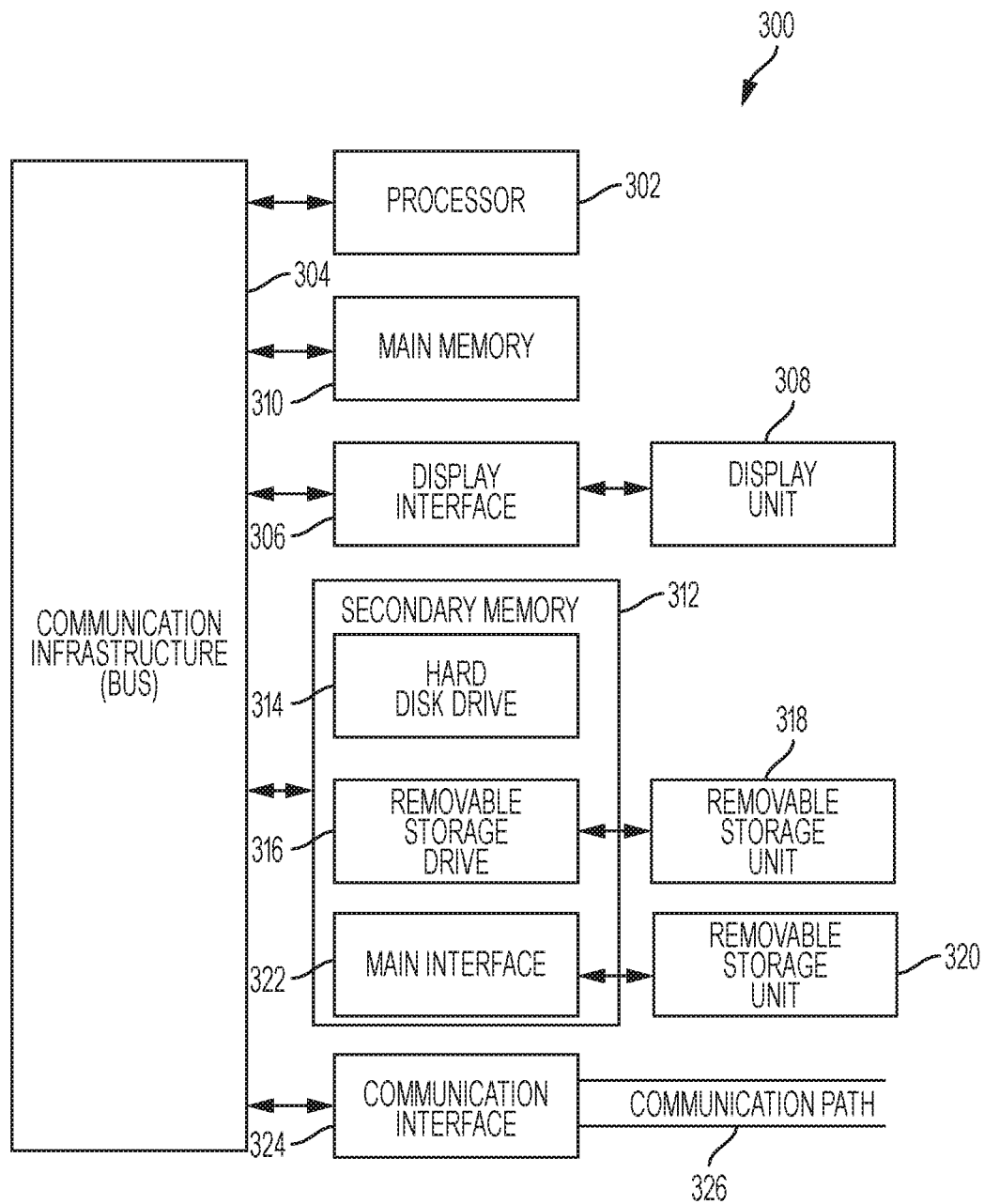
FIG. 3 depicts an exemplary computer system capable of implementing one or more embodiments of the present invention.

Turning now to a more detailed description of aspects of the present invention, FIG. 3 illustrates a high level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
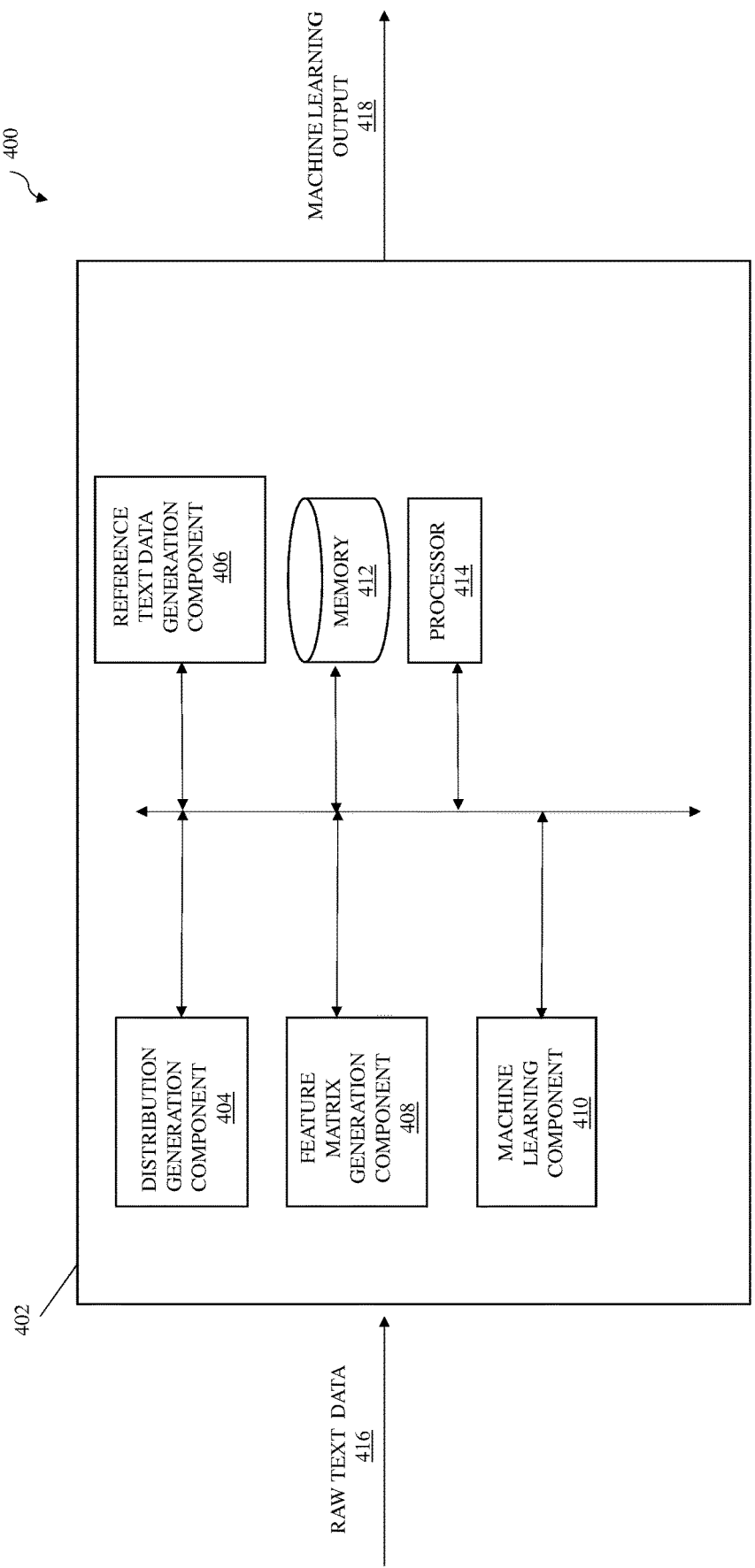
FIG. 4 depicts an exemplary system that facilitates machine learning using text data in accordance with one or more embodiments of the present invention.

FIG. 4 illustrates a block diagram of an example, non-limiting system 400 that facilitates unsupervised feature representation learning for text data in accordance with one or more embodiments of the present invention. System 400 is configured to learn a feature representation for raw text data by approximating a positive definite kernel via random document embedding, in particular, by transforming distance measurements between words in text data to a randomized low-dimensional feature space using random document embedding, in which a number R of random text sequences of random length D are used to generate a feature representation that can be combined with various machine learning methods to perform a wide variety of tasks.

System 400 is a machine learning system that can be utilized to solve a variety of technical issues (e.g., learning previously unknown functional relationships) in connection with technologies such as, but not limited to, machine learning technologies, text data processing technologies, data analytics technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies. System 400 employs hardware and/or software to solve problems that are highly technical in nature, that are not abstract and that cannot be performed as a set of mental acts by a human.

In certain embodiments of the invention, some or all of the processes performed by system 400 are performed by one or more specialized computers (e.g., one or more specialized processing units, a specialized computer with text data component, etc.) for carrying out defined tasks related to machine learning. In some embodiments of the invention, system 400 and/or components of the system are employed to solve new problems that arise through advancements in technologies mentioned above, employment of text data, machine learning process, and/or computer architecture, and the like. In one or more embodiments of the invention, the system 400 provides the above-described technical improvements to text data systems, machine learning systems, artificial intelligence systems, data analytics systems, data classification systems, data clustering systems, trajectory/journey analysis systems, medical device systems, collaborative filtering systems, recommendation systems, signal processing systems, word embedding systems, topic model systems, image processing systems, video processing systems, and/or other digital systems. In one or more embodiments of the invention, the system 400 also provide technical improvements to a central processing unit associated with a machine learning process by improving processing performance of the central processing unit, reducing computing bottlenecks of the central processing unit, improving processing efficiency of the central processing unit, and/or reducing an amount of time for the central processing unit to perform the machine learning process.

In FIG. 4, system 400 includes a text data component 402 that includes a distribution generation component 404, a reference text data generation component 406, a feature matrix generation component 408, and a machine learning component 410. In some embodiments of the invention, text data component 402 constitutes machine-executable component(s) embodied within machine(s), (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the invention, text data component 402 includes memory 412 that stores computer executable components and instructions.

Furthermore, text component 402 in some embodiments of the invention includes a processor 414 to facilitate execution of the instructions (e.g., computer executable components and corresponding instructions) by text data component 402. As shown, distribution generation component 404, reference text data generation component 406, feature matrix generation component 408, machine learning component 410, memory 412, and/or processor 414 are electrically and/or communicatively coupled to one another in one or more embodiments of the invention.

In general, text data component 402 is configured to receive text data 416 and output a machine learning output 418. Text data 416 includes streams or sequences of text data. In some embodiments of the invention, text data 416 includes two or more sequences of text data, such as for example, two documents, a document and a paragraph, two paragraphs, a paragraph and a sentence, etc. In some embodiments of the invention, text data 416 is raw text (e.g., unprocessed text data).

The distribution generation component 404 is configured to generate one or more probability distributions for use by system 400. In some embodiments of the invention, distribution generation component 404 generates metadata pertaining to raw text data 416. For example, in some embodiments of the invention distribution generation component 404 generates a probability distribution of raw text data 416. In some embodiments of the invention, rather than generating a probability distribution from raw text data 416, the distribution generation component generates or selects a random distribution. In some embodiments of the invention, the distribution is generated through the use of a pre-trained word vector space, such as a Word2Vec space. In some embodiments of the invention, the distribution is generated by training a domain text corpus using a word vector library, such as a Word2Vec library. The distribution generation component 404 is configured to transmit the resulting distribution to the reference text data generation component 406 for further processing.

Together, reference text data generation component 406 and feature matrix generation component 406 perform a random features based approximation process. In particular, reference text data generation component 406 is configured to generate reference text data including a set of random text sequence, in which text sequence is of a random length and comprises a number of random words. Each random length is sampled from a minimum length to a maximum length to capture the optimal alignment of text data 416. The corresponding words of each random text sequence in the set are drawn from the distribution that is provided by distribution generation component 404. In some embodiments of the invention, the minimum length and the maximum length are parameters that are selected, provided, predetermined, or automatically learned by system 400. In some embodiments of the invention, the minimum length is 1 and the maximum length is 5. After generating the reference text data that includes the set of random text sequences, generation component 406 transmits the reference text data to feature matrix generation component 408.

Feature matrix generation component 406 is configured to generate a feature matrix for text data 416 based at least in part on a set of computed distances between the generated set of random text sequences and text data 416. In some embodiments of the invention, a set of feature vectors are computed between text data 416 and the set of random text sequences. In some embodiments of the present invention, the set of feature vectors are generated through the use of a document distance measuring technique, such as through the use of Word Mover's Distance (WMD). Other suitable document distance measuring techniques may be utilized. The feature vectors are then concatenated to form the feature matrix. In some embodiments of the invention, the feature vectors and/or feature matrix are generated via other suitable distance functions that can be used to measure a word vector space as known to those having skill in the art.

Some of the functions performed by reference text data generation component 406 and feature matrix generation component 408 can be expressed mathematically via one or more algorithms. For example, in order to compute a kernel approximation a Monte Carlo (MC) based analysis method, like the one described below, is implemented in which random features are evaluated in a kernel space. In order to compute a positive definite kernel, in some embodiments of the invention, distance measurements between words in text data are transformed into a low-dimensional Euclidean inner product space using a set of random documents (e.g., set of random text sequences), by exploiting a distance measurement, such as WMD, to find alignments between a set of words represented in a word vector embedding space, and the text and random documents. Thus kernel evaluation of a WMD kernel can approximated by the inner products of a transformed feature representation:

$$k(x, y) \approx \frac{1}{R}\sum_{i=1}^{R} \phi_{\omega_i}(x)\phi_{\omega_i}(y) = \langle z(x), z(y) \rangle,$$

where $\{\omega_i\}_{i=1}^{R}$ represents independently and identically distributed (i.i.d.) random documents that are drawn from a distribution $p(\omega)$, in which $p(\omega)$ represents a distribution over the space of all possible documents denoted as $\Omega := \cup_{D=1}^{D_{max}} \mathcal{V}^D$. Distribution $p(\omega)$ is a distribution that well captures the characteristics of a word vector embedding space, such as a Word2Vec embedding space, in order to generate a meaningful random word. The space of all possible documents $\Omega := \cup_{D=1}^{D_{max}} \mathcal{V}^D$ represents an infinite-dimensional feature map that is derived from a distance measure between a document x and all possible random documents $\omega \in \Omega$. For example, given a document x, a feature vector $$z(x) := \left(\frac{1}{\sqrt{R}} \phi_{\omega_i}(x)\right)_{i=1}^{R}$$

is generated for the given document x, in which $\phi_\omega(x) := \exp(-\gamma \text{WMD}(x, \omega))$.

A distance measurement, such as WMD, can be used to measure the distance between text documents (e.g., text sequences). For example, given a first text document x and a second documeny y x, $y \in \chi$, an WMD measurement is calculated that takes into account alignments between the words x and y. Thus, given the length of each document $|x|$, $|y|$ being the number of distinct words $w_1, \ldots, w_L$ ($L=\|x\| \text{ or } \|y\|$) in x and y, and $f_x \in \mathbb{R}^{|x|}$, $f_y \in \mathbb{R}^{|y|}$ being the normalized frequencies vectors of each word in x and y respectively (so $f_x^T 1 = f_y^T 1 = 1$), WMD can be defined as $$WMD(x, y) := \min_{F \in \mathbb{R}_+^{|m| \times |v|}} \langle C, F \rangle, \text{ s.t., } F1 = f_x, F^T 1 = f_y.$$

F represents the transportation flow matrix with $F_{ij}$ denoting the amount of flow traveling from word i in x to word j in y, and C represents the transportation cost (e.g., ground distance) with $C_{ij}:=\text{dist}(v_i,v_j)$, which is the distance between two words measured in a word vector embedding space such as a Word2Vec embedding space.

In order to lower the variance of $\langle z(x),z(y) \rangle$, a MC method can be applied to compute $$k(x, y) \approx \frac{1}{R} \sum_{i=1}^{R} \phi_{\omega_i}(x) \phi_{\omega_i}(y) = \langle z(x), z(y) \rangle,$$

Matrix generation component 408 generates a feature vector $$z(x) := \left( \frac{1}{\sqrt{R}} \phi_{\omega_i}(x) \right)_{i=1}^{R}$$

based at least in part on WMD measurements, where $w_j$ is a random text sequence of length D with each word of the text sequence being drawn from distribution $p(\omega)$. This computation can be performed by generating random documents $w_j$ consisting of $D_j$ number of random words where each random word is associated with a word vector $v_j$ that is drawn from $p(\omega)$, where each $D_j$ is sampled from [DMin, DMax]. In one example implementation, the minimum number of random words DMin is 1 and the maximum number of random words DMax is 5.

After the feature vectors are generated, a feature matrix $Z_{N \times R}$ is created by concatenating the feature vectors of each document. The algorithm shown below is one example procedure for generating a feature matrix and feature vectors for raw text data.

```
Input: Text documents {x_i}_{i=1}^N, 1 < |x_i| < L, DMin, DMax, R,
       distribution p(ω) of random documents.
Output: Feature matrix Z_{N×R} for texts of any length
1:  for j = 1, . . . , R do
2:     Draw D_j uniformly from [DMin, DMax]. Generate random
       documents ω_j consisting of D_j number of random words where
       each associated word vector v_j drawn from distribution p(ω).
3:     Compute a feature vector Z_j = φ_{ω_j}(x_{i=1}^N)) using WMD
4:  end for
5:  
    Return feature matrix Z({x_i}_{i=1}^N) = \frac{1}{\sqrt{R}} [Z'_1 Z'_2 ... Z'_R]
```

In some embodiments of the present invention, the distribution $p(\omega)$ is generated and/or optained by an end-user by using a pre-trained word vector space, such as a Word2Vec space, or by training a end-user's domain text corpus using a word vector library, such as aWord2Vec library. In some embodiments of the invention, if no prior information for an optimal alignment is provided to the system, the system samples the length of random documents to give an unbiased estimate of D. This may be achieved by, for example, choosing a random distribution such as a distribution of a pre-established Word2Vec space. The pre-established Word2Vec space may be provided by a third party in certain embodiments of the present invention. In some embodiments of the present invention, additional metadata, such as the DMin and DMax of the word vectors, is generated or provided to the system by an end-user.

As noted above, compared to KNN-based WMD methods, the approximation methodology identified above only requires super-linear complexity of O(NRL log(L)) computation when D is treated as a constant. This dramatic reduction in computation allows for more efficient training and testing when combining with empirical risk minimization (ERM) classifiers such as SVM.

Referring back to FIG. 4, machine learning component 410 processes a machine learning model based at least in part on the feature matrix generated for text data 416. In some embodiments of the invention, the feature matrix generated by feature matrix generation component 408 is provided as an input for a machine learning model executed by the machine learning component 410. In certain embodiments of the invention, the machine learning component 410 employs parallel computing to process portions of the feature matrix with portions of the time-series data 416. For instance, in some embodiments of the invention, the machine learning component 410 performs parallel computing associated with two or more processors that process one or more portions of text data 416 in parallel. In one example, the machine learning component 410 executes a classification machine learning model using the generated feature matrix. In some embodiments of the invention, a classification machine learning model is a machine learning model that maps text data 416 to one or more categories. In another example, machine learning component 410 executes a regression machine learning model using the generated feature matrix. A regression machine learning model can be, for example, a machine learning model that determines relationships among text sequences of text data 416. In yet another example, machine learning component 410 executes a clustering machine learning model using the generated feature matrix. In some embodiments of the invention, the clustering machine learning model is a machine learning model that groups related data from text data 416 into a corresponding group, for example, nearest neighbors algorithms. Machine learning component 410 generates machine learning output 418. In some embodiments of the invention, machine learning output 418 is generated by the machine learning model that is processed by machine learning component 410 based at least in part on the generated feature matrix. In some embodiments of the present invention, machine learning output 418 provides one or more inferences, provides one or more predictions, and/or determines one or more relationships among text data 416 (e.g., among one or more text sequences). As such, direct analysis and/or direct processing of text data 416 is provided in certain embodiments of the invention. Moreover, performance of a processor (e.g., the processor 414) with respect to a machine learning process (e.g., a speed for performing machine learning and/or an amount of memory employed for machine learning) can be improved by allowing a machine learning model to employ matrices as inputs and/or to directly analyze raw text data. Furthermore, processing capability of a processor (e.g., the processor 414) associated with a machine learning process can be improved by allowing a machine learning model to employ matrices as inputs and/or to directly analyze raw text data. In some embodiments of the invention, indirect analysis is performed by the system 400, and as such text data 416 is not directly analyzed by system 400.

Text data component 402 (e.g., distribution generation component 404, reference text data generation component 406, feature matrix generation component 408, and/or the machine learning component 410) performs a distribution generation process, a reference text data generation process, a feature matrix generation process, and/or a machine learning process associated with time-series data (e.g., text data 416) that cannot be performed by a human (e.g., is greater than the capability of a single human mind). For example, an amount of text data processed, a speed of processing of text data, and/or data types of the text data processed by the text data component 402 (e.g., distribution generation component 404, reference text data generation component 406, feature matrix generation component 408, and/or the machine learning component 410) over a certain period of time can be greater, faster, and different than an amount, speed, and data type that can be processed by a single human mind over the same period of time. In some embodiments of the invention, the text data component 402 (e.g., distribution generation component 404, reference text data generation component 406, feature matrix generation component 408, and/or the machine learning component 410) is fully operational towards performing one or more other functions (e.g., fully powered on, fully executed, etc.) while also performing the above-referenced distribution generation process, reference text data generation process, feature matrix generation process, and/or machine learning process. Moreover, in some embodiments of the invention, a machine learning output (e.g., machine learning output 418) generated by text data component 402 (e.g., distribution generation component 404, reference text data generation component 406, feature matrix generation component 408, and/or the machine learning component 410) includes information that is impossible to obtain manually by a user. For example, in some embodiments of the invention, an amount of information included in the machine learning output (e.g., machine learning output 418), and/or a variety of information included in the machine learning output (e.g., machine learning output 418) is more complex than information obtained manually by a user.

In some embodiments of the invention, machine learning component 410 employs one or more artificial intelligence techniques to execute the at least one machine learning model based at least in part on the generated feature matrix. For example, in some embodiments of the invention, machine learning component 410 extracts information that is indicative of correlations, inferences, and/or expressions from the generated feature matrix based at least in part on principles of artificial intelligence. In some embodiments of the invention, machine learning component 410 generates machine learning output 418 based at least in part on the execution of the at least one machine learning model using the generated feature matrix. In some embodiments of the invention, machine learning output 418 includes, for example, learning, correlations, inferences, and/or expressions associated with the generated feature matrix.

In some embodiments of the invention, machine learning component 410 performs learning with respect to the generated feature matrix explicitly or implicitly. In some embodiments of the invention, machine learning component 410 employs an automatic classification system and/or an automatic classification process to facilitate analysis of generated feature matrix. For example, in some embodiments of the invention, machine learning component 410 employs a probabilistic and/or statistical-based analysis (e.g., factoring into the analysis utilities and costs) to learn and/or generate inferences with respect to the generated feature matrix. Machine learning component 410 employs, for example, a support vector machine (SVM) classifier to learn and/or generate inferences for the generated feature matrix. Additionally or alternatively, in some embodiments of the invention, machine learning component 410 employs other classification techniques associated with Bayesian networks, decision trees, and/or probabilistic classification models. Classifiers employed by the machine learning component 410 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be, for example, a function that maps an input attribute vector, $x=(x_1, x_2, x_3, x_4, x_n)$, to a confidence that the input belongs to a class—that is, $f(x)=$confidence (class).

In some embodiments of the invention, machine learning component 410 includes an inference component (not shown) that further enhances automated aspects of the machine learning component 410 utilizing in part inference based schemes to facilitate learning, and/or generating inferences for the generated feature matrix. In some embodiments of the invention, machine learning component 410 employs any suitable machine-learning based techniques, statistical-based techniques, and/or probabilistic-based techniques. For example, in some embodiments of the invention, machine learning component 410 employs expert systems, fuzzy logic, SVMs, Hidden Markov Models (HMMs), greedy search algorithms, rule-based systems, Bayesian models (e.g., Bayesian networks), neural networks, and/or other non-linear training techniques, data fusion, utility-based analytical systems, systems employing Bayesian models, etc. In some embodiments of the invention, machine learning component 410 performs a set of machine learning computations associated with analysis of the generated feature matrix. For example, in some embodiments of the invention, machine learning component 410 performs a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, Gaussian mixture model machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations, and/or a set of different machine learning computations.

Figure 5:
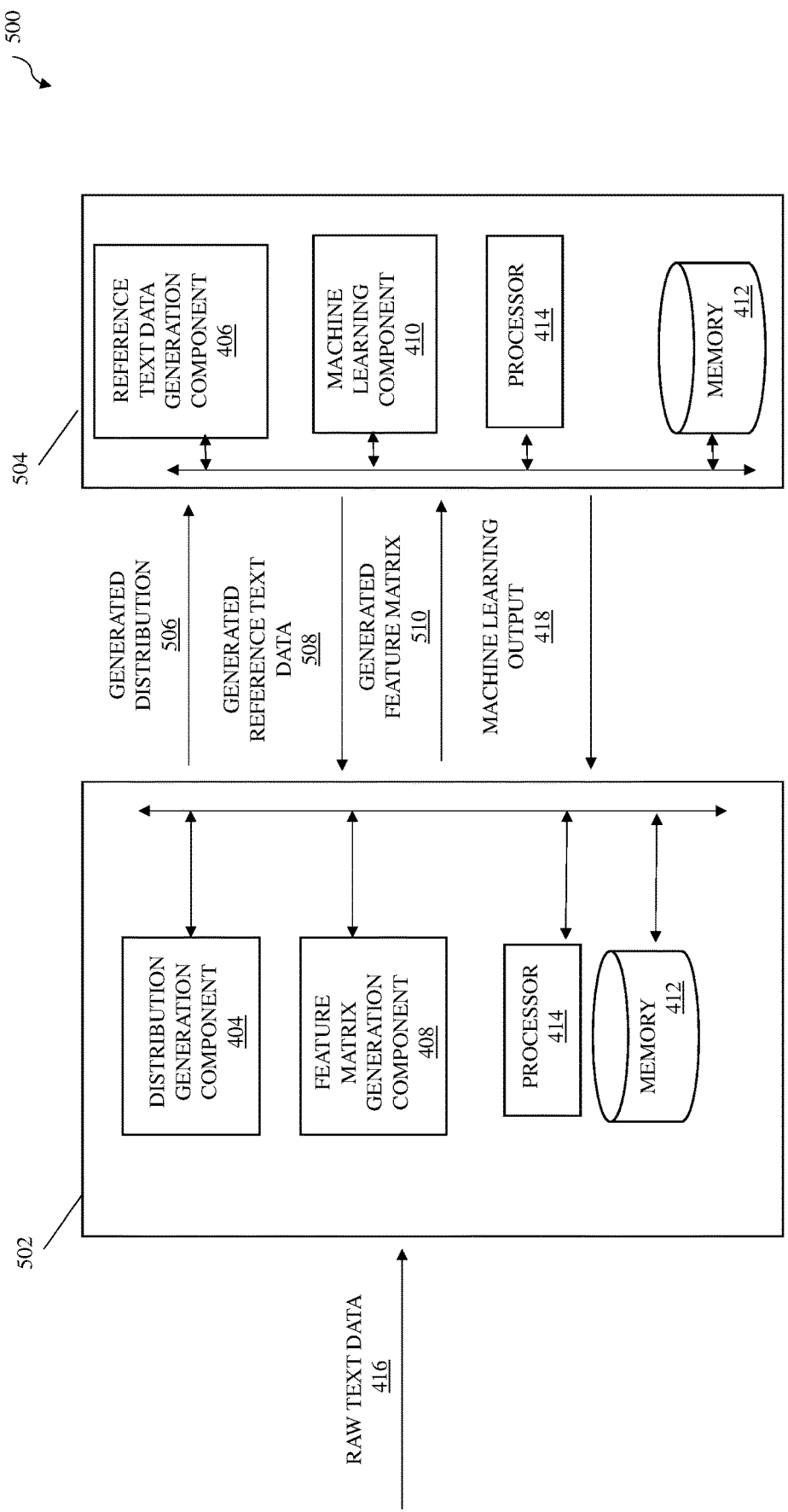
FIG. 5 depicts another exemplary system that facilitates machine learning using text data in accordance with one or more embodiments of the present invention.

In the embodiment shown in FIG. 5, system 500 is a two-party protocol system that includes first-party component 502 and second-party component 504. This environment is particularly useful for situations where privacy of text data (e.g., text data 416) is a concern. For example, if a customer wishes to have machine learning performed by an analytics provider on text data but does not wish, or is unable to transfer the text data to the analytics provider, in some embodiments of the invention first-party component 502 is employed by the customer and second-party component 504 is employed by the analytics provider in the manner identified below.

As shown in FIG. 5, first-party component 502 includes distribution component 404 and feature matrix generation component 408. Second-party component 504 includes reference text data generation component 406 and machine learning component 410. In some embodiments of the invention, the first-party component 502 and/or the second-party component 504 include a processor 410 and memory 412.

In some embodiments of the invention, distribution generation component 404 of the first-party component is configured to generate metadata information pertaining to text data 416 by, for example, generating a probability distribution 506 from text data 416. In some embodiments of the invention, distribution generation component 404 transmits the generated probability distribution 506 of the text data 416 to the second-party component 504. In some embodiments of the invention, the first-party component 502 does not generate or provide metadata information pertaining to the text data 416 to the second-party component 504.

Feature matrix generation component 408 of first-party component 502 is configured to receive the generated reference text data 508 from second-party component 504 and to generate feature matrix 510 based at least in part on the set of random text sequences of the generated text data 508. Feature matrix generation component 408 is further configured to transmit the generated feature matrix 510 to the second-party component 504.

In some embodiments of the invention, reference text data generation component 406 of second-party component 504 is configured to receive the generated metadata information (e.g., the probability distribution 506) from first-party component 502 and to generate the reference text data 508 comprising the set of random sequences. In some embodiments of the invention, the second-party component 504 does not receive metadata information pertaining to the time-series data 416. In some of those instances, second-party component 504 will select or generate a random distribution such as Gaussian distribution. Moreover, in some embodiments of the invention, reference text data generation component 406 is configured to transmit the reference text data 508 to the first-party component 502.

Machine learning component 410 of second-party component 504 is configured to receive the generated feature matrix 510 from first-party component 502 and to provide the generated feature matrix 510 as the input to the one or more machine learning models. Machine learning component 410 of second-party component 504 is further configured to transmit machine learning output 418 from the machine learning models to first-party component 502.

Figure 6:
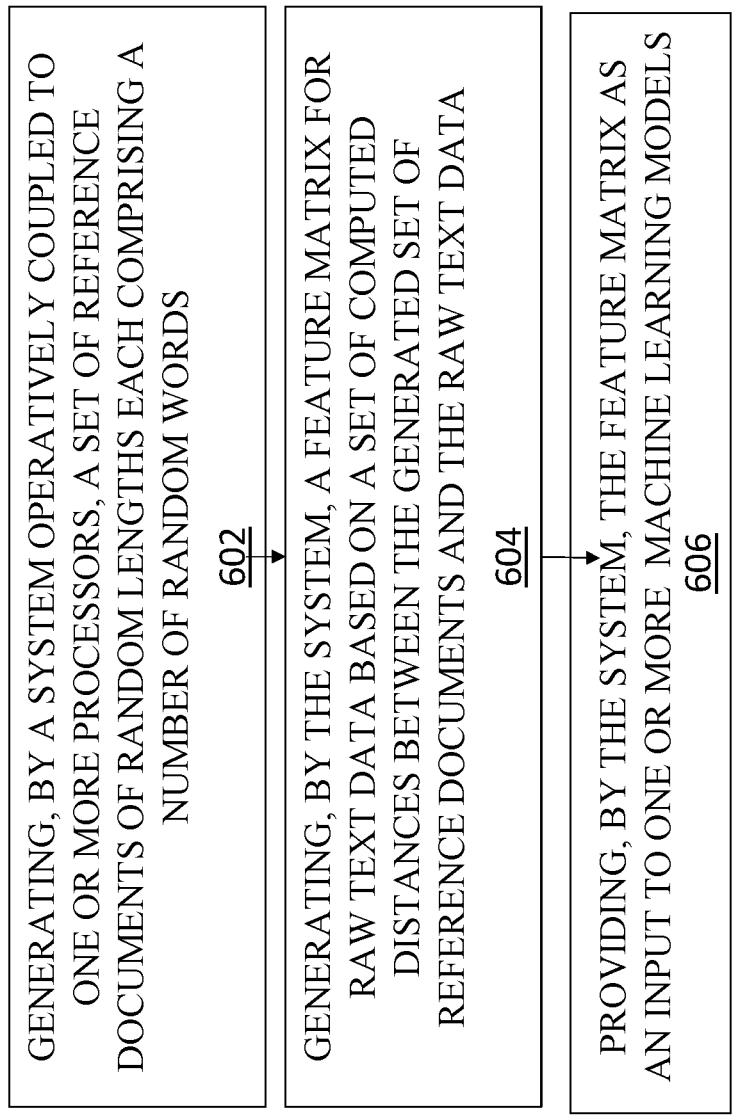
FIG. 6 depicts a flow diagram illustrating a methodology in accordance with one or more embodiments of the present invention.

Additional details of the operation of system 400 and system 500 will now be described with reference to FIG. 6, wherein FIG. 6 depicts a flow diagram illustrating a methodology 600 according to one or more embodiments of the present invention. At 602, reference text data is generated that includes a set of random sequences, each sequence being of a random length and each text sequence including a number of random words. In this embodiment, the reference text data is generated, by a system operatively coupled to a processor (e.g., by reference series generation component 406). At 604, a feature matrix for raw text data is generated, by the system (e.g., by feature matrix generation component 408), in which the feature matrix is generated based at least in part on a set of computed distances between the generated set of the set of random text sequences and the raw text data. At 608, one or more machine learning models are executed by the system (e.g., by machine learning component 410) based at least in part on the generated feature matrix.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing unsupervised feature representation learning for text data comprising:

generating, by a processor system, reference text data comprising a set of random text sequences, wherein each text sequence of the set of random text sequences is of a random length and comprises a number of random words, wherein the generating the reference text data comprises sampling random lengths from a minimum length through a maximum length from raw text data in order to result in the set of random text sequences and in order to have a lower dimensional space for the raw text data, the minimum length being a first value of 1, the maximum length being a second value of 5, and wherein the random words of each text sequence in the set are drawn from a random probability distribution of the raw text data derived from a pre-trained word vector space in order to have the lower dimensional space for the raw text data;

generating, by the processor system, a feature matrix for raw text data based at least in part on a set of computed distances between the set of random text sequences and the raw text data;

training one or more machine learning models having a support vector machine, by the processor system, on a text corpus such that the one or more machine learning models learn to generate inferences from the feature matrix, the training comprising the one or more machine learning models mapping an input attribute vector to a confidence that the input attribute vector belongs to a class;

inputting, by the processor system, the feature matrix as an input to the one or more machine learning models;

inferring, using the one or more machine learning models by the processor system, a relationship between the input of the feature matrix and an output, the feature matrix being the input provided to improve processing efficiency of the one or more machine learning models, thereby reducing computation and memory storage by the processor system by using the feature matrix based on having the lower dimensional space for the raw text data.

2. The computer-implemented method of claim 1, wherein generating the feature matrix includes:

computing, by the processor system, a set of feature vectors between the raw text data and the set of random text sequences using a document distance measuring technique; and concatenating, by the system, the feature vectors to generate the feature matrix.

3. The computer-implemented method of claim 1, wherein the distribution comprises a random probability distribution of a word vector space.

4. The computer-implemented method of claim 1, wherein the distribution comprises a probability distribution of a word vector space generated from the raw text data.

5. The computer-implemented method of claim 4, wherein the word vector space comprises a pre-trained word2vec embedding space.

6. The computer-implemented method of claim 4, wherein the word vector space comprises a trained word2vec embedding space.

7. The computer-implemented method of claim 4, wherein the processor system comprises a two-party protocol system comprising a first-party component and a second-party component, wherein the first-party component is configured to generate the random probability distribution from the raw text data, transmit the random probability distribution of the raw text data to the second-party component, receive the reference text data from the second-party component, generate the feature matrix based at least in part on the set of random text sequences, and transmit the generated feature matrix to the second-party component.

8. The computer-implemented method of claim 7, wherein the second-party component is configured to receive the random probability distribution from the first-party component, generate the reference text data, transmit the reference text data to the first-party component, receive the generated feature matrix from the first party-component, provide the feature matrix as the input to the one or more machine learning models, and transmit results from the machine learning models to the first-party component.

9. A computer program product for performing unsupervised feature representation learning for text data, the computer program product comprising a computer readable storage medium having program instructions embodied therewith, wherein the computer readable storage medium is not a transitory signal per se, the program instructions executable by a processor system to cause the processor system to perform a method comprising:
generating, by the processor system, reference text data comprising a set of random text sequences, wherein each text sequence of the set of random text sequences is of a random length and comprises a number of random words, wherein the generating the reference text data comprises sampling random lengths from a minimum length through a maximum length from raw text data in order to result in the set of random text sequences and in order to have a lower dimensional space for the raw text data, the minimum length being a first value of 1, the maximum length being a second value of 5, and wherein the random words of each text sequence in the set are drawn from a random probability distribution of the raw text data derived from a pre-trained word vector space in order to have the lower dimensional space for the raw text data;
generating, by the processor system, a feature matrix for raw text data based at least in part on a set of computed distances between the set of random text sequences and the raw text data;
training one or more machine learning models having a support vector machine, by the processor system, on a text corpus such that the one or more machine learning models learn to generate inferences from the feature matrix, the training comprising the one or more machine learning models mapping an input attribute vector to a confidence that the input attribute vector belongs to a class;
inputting, by the processor system, the feature matrix as an input to the one or more machine learning models;
inferring, using the one or more machine learning models by the processor system, a relationship between the input of the feature matrix and an output, the feature matrix being the input provided to improve processing efficiency of the one or more machine learning models, thereby reducing computation and memory storage by the processor system by using the feature matrix based on having the lower dimensional space for the raw text data.

10. The computer program product of claim 9, wherein generating the feature matrix includes:
computing, by the processor system, a set of feature vectors between the raw text data and the set of random text sequences using a document distance measuring technique; and
concatenating, by the system, the feature vectors to generate the feature matrix.

11. The computer program product of claim 9, wherein the distribution comprises a random probability distribution of a word vector space.

12. The computer program product of claim 9, wherein the distribution comprises a probability distribution of a word vector space generated from the raw text data.

13. The computer program product of claim 12, wherein the word vector space comprises a pre-trained word2vec embedding space.

14. The computer program product of claim 12, wherein the word vector space comprises a trained word2vec embedding space.

15. The computer program product of claim 12, wherein the processor system comprises a two-party protocol system comprising a first-party component and a second-party component, wherein the first-party component is configured to generate the random probability distribution from the raw text data, transmit the random probability distribution of the raw text data to the second-party component, receive the reference text data from the second-party component, generate the feature matrix based at least in part on the set of random text sequences, and transmit the generated feature matrix to the second-party component.

16. A system for performing unsupervised feature representation learning for text data, the system comprising one or more processors configured to perform a method comprising:
generating, by the system, reference text data comprising a set of random text sequences, wherein each text sequence of the set of random text sequences is of a random length and comprises a number of random words, wherein the generating the reference text data comprises sampling random lengths from a minimum length through a maximum length from raw text data in order to result in the set of random text sequences and in order to have a lower dimensional space for the raw text data, the minimum length being a first value of 1, the maximum length being a second value of 5, and wherein the random words of each text sequence in the set are drawn from a random probability distribution of the raw text data derived from a pre-trained word vector space in order to have the lower dimensional space for the raw text data;
generating, by the system, a feature matrix for raw text data based at least in part on a set of computed distances between the set of random text sequences and the raw text data;
training one or more machine learning models having a support vector machine, by the processor system, on a text corpus such that the one or more machine learning models learn to generate inferences from the feature matrix, the training comprising the one or more machine learning models mapping an input attribute vector to a confidence that the input attribute vector belongs to a class;

inputting, by the system, the feature matrix as an input to the one or more machine learning models;

inferring, using the one or more machine learning models by the system, a relationship between the input of the feature matrix and an output, the feature matrix being the input provided to improve processing efficiency of the one or more machine learning models, thereby reducing computation and memory storage by the system by using the feature matrix based on having the lower dimensional space for the raw text data.

17. The system of claim 16, wherein generating the feature matrix includes:

computing, by the processor system, a set of feature vectors between the raw text data and the set of random text sequences using a document distance measuring technique; and concatenating, by the system, the feature vectors to generate the feature matrix.

18. The system of claim 16, wherein the distribution comprises a random probability distribution of a word vector space.

19. The system of claim 16, wherein the distribution comprises a probability distribution of a word vector space generated from the raw text data.

20. The system of claim 19, wherein the word vector space comprises a pre-trained word2vec embedding space.

21. The system of claim 19, wherein the word vector space comprises a trained word2vec embedding space.

22. The system of claim 19, wherein the system comprises a two-party protocol system comprising a first-party component and a second-party component, wherein the first-party component is configured to generate the random probability distribution from the raw text data, transmit the random probability distribution of the raw text data to the second-party component, receive the reference text data from the second-party component, generate the feature matrix based at least in part on the set of random text sequences, and transmit the generated feature matrix to the second-party component.

23. The system of claim 22, wherein the second-party component is configured to receive the random probability distribution from the first-party component, generate the reference text data, transmit the reference text data to the first-party component, receive the generated feature matrix from the first party-component, provide the feature matrix as the input to the one or more machine learning models, and transmit results from the machine learning models to the first-party component.

24. The computer-implemented method of claim 1, wherein the one or more machine learning models comprise a support vector machine.

* * * * *